(12) United States Patent
Takashima et al.

(10) Patent No.: US 7,391,004 B2
(45) Date of Patent: Jun. 24, 2008

(54) PHOTO DETECTING APPARATUS (75) Inventors: Hajime Takashima, Atsugi (JP);
Kuniyuki Tani, Ogaki (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 11/692,709

(22) Filed: Mar. 28, 2007

(65) Prior Publication Data

US 2007/0262238 A1 Nov. 15, 2007

(30) Foreign Application Priority Data

Mar. 31, 2006 (JP) ............... 2006-097624

(51) Int. Cl.
*H01L 27/00* (2006.01)
*H04N 5/335* (2006.01)
(52) U.S. Cl. ..................... 250/208.1; 348/308
(58) Field of Classification Search ............. 250/208.1, 250/214 R, 214 A; 348/294, 297, 300, 302, 348/308
See application file for complete search history.

(56) References Cited

U.S. PATENT DOCUMENTS 6,927,796 B2 * 8/2005 Liu et al. ................. 348/297

FOREIGN PATENT DOCUMENTS

JP 2001-197362 7/2001
JP 2004-363666 12/2004

OTHER PUBLICATIONS

Masayuki Ikebe, et al., "Evaluation of a Functional Initializing for a CMOS-Image Sensor," Technical Report of IEICE, Sep. 2003, pp. 19-24, vol. 103, No. 298, The Institute of Electronics, Information and Communication Engineers.

* cited by examiner

*Primary Examiner*—Kevin Pyo
(74) *Attorney, Agent, or Firm*—Ditthavong Mori & Steiner, P.C.

(57) ABSTRACT

A pixel circuit includes a first detector which amplifies a voltage obtained by charging and discharging a capacitance with a photocurrent flowing through a photo detecting element and then outputs it to a first data line, and a second detector which outputs an electric charge stored in the capacitance by the photocurrent, to a second data line. The pixel circuit operates in a first operation mode where the first detector is activated, a second operation mode where the second detector is activated and an initialization mode where the photo detecting element is initialized. With a first transistor turned on, the second detector outputs an electric charge stored in the capacitance in the second operation mode, and in the initialization mode a reset voltage set in the second data line is applied to the other end of the photo detecting element to initialize the photo detecting element.

16 Claims, 11 Drawing Sheets

PHOTO DETECTING APPARATUS

BACKGROUND OF THE INVENTION

1. Field of the Invention

The present invention relates to a CMOS image sensor and other photo detecting devices.

2. Description of the Related Art

In recent years, CCD (Charge Coupled Device) or CMOS (Complementary Metal Oxide Semiconductor) image sensors are often used in a variety of image pickup apparatuses, such as digital still cameras and digital video cameras.

A number of benefits can be gained by choosing a CMOS image sensor. For example, a CMOS image sensor can be produced on the same manufacturing line as general chips, and it can be turned into a single chip together with the peripheral functions. Also, a CMOS image sensor, which can be driven at lower voltage than a CCD type, consumes less power than it.

Each pixel of a CMOS sensor has a structure including a photodiode and a switch using MOSFETs. That is, the sensor has a matrix of photodiodes, each of which has a switch attached thereto, and the potential of each pixel is read out by operating these switches one by one.

Figure 1:
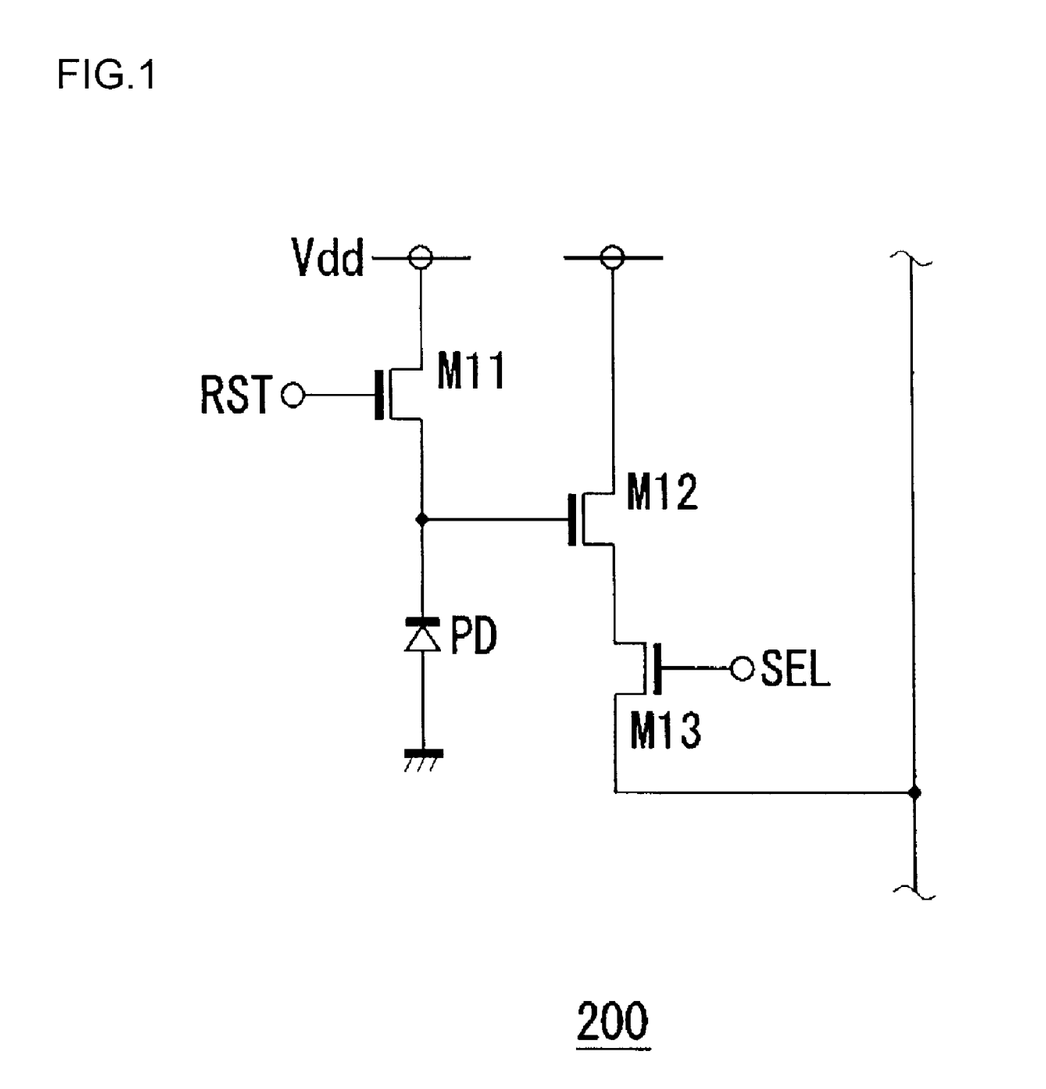
FIG. 1 is a circuit diagram showing a structure of a pixel circuit of a conventional CMOS image sensor.

FIG. 1 is a circuit diagram showing a structure of a pixel circuit 200 of a conventional CMOS image sensor. This pixel circuit 200 includes a photodiode PD, a reset transistor M11, an amplifying transistor M12, and an output transistor M13. The reset transistor M11, the amplifying transistor M12, and the output transistor M13 are each an n-channel MOSFET. The reset transistor M11 and the photodiode PD are connected in series between a supply voltage Vdd and a ground voltage GND. A source terminal of the reset transistor M11 is connected to the photodiode PD, and the supply voltage Vdd is applied to a drain terminal thereof. A reset signal RST is inputted to a gate terminal of the reset transistor M11.

A cathode terminal of the photodiode PD, which is connected with the reset transistor M11, is connected to a gate terminal of the amplifying transistor M12. When the supply voltage Vdd is applied to a drain terminal of the amplifying transistor M12 and a source terminal is connected to a drain terminal of the transistor M13, the amplifying transistor M12 functions as a source follower. A source terminal of the output transistor M13 is connected to a data line LD, which is provided for each column of the CMOS image sensor.

In a pixel circuit 200 structured as described above, when a reset signal RST inputted to the gate terminal of the reset transistor M11 goes to a high level, the reset transistor M11 turns on, thereby applying a supply voltage Vdd to the photodiode PD and charging the cathode terminal thereof with the supply voltage Vdd. Next, the reset transistor M11 turns off. In this state, if light strikes the photodiode PD, a photocurrent will flow, and a negative charge will be stored in the cathode terminal of the photodiode PD. At this time, the voltage at the cathode terminal of the photodiode PD changes with the light intensity and the charge storage time.

After the passage of a predetermined storage time, a selection signal SEL is set to a high level, which turns on the output transistor M13. As a result, the voltage at the cathode terminal of the photodiode PD is amplified by the amplifying transistor M12 and outputted to the data line LD. In this manner, a voltage corresponding to the amount of light received by the photodiode is outputted to the data line LD, and an external circuit can read the amount of light received by each pixel circuit.

The following discussion concerns the dynamic range of a pixel circuit of a conventional CMOS sensor as shown in FIG. 1. As described above, in detecting the amount of light received by each pixel, the photodiode PD is charged with a power supply voltage Vdd, a negative charge is stored at the cathode terminal of the photodiode PD during the exposure period, and the charge amount is converted into voltage to determine the amount of light received. Accordingly, if a strong light enters the photodiode PD and the voltage at the cathode terminal of the photodiode PD drops significantly during the charge storage period, then the amplifying transistor M12 will stop amplifying the voltage at the cathode terminal of the photodiode PD. Consequently, the pixel circuit 200 can no longer detect the amount of light having entered the photodiode PD.

Conversely, if the charge storage time is shortened, the voltage at the cathode terminal of the photodiode PD will not drop much, so that strong light may be detected. However, if a weak light enters in this state, then the voltage at the cathode terminal of the photodiode PD will little change, so that the weak incident light may not be detected. With the conventional pixel circuit 200, therefore, the dynamic range is subject to limitation by the amount of initial charge stored at the cathode terminal of the photodiode PD in the reset state. And the conventional technique for widening the dynamic range has been through logarithmic conversion or changing the charge storage time and gain.

Such techniques employ a form of circuit called an active pixel sensor as shown in FIG. 1. This, however, has a problem that the shorter the charge storage time is made, the more the power consumption will be for driving the circuit at high speed. Also, in changing the gain, it is inevitable that the circuit be made larger in scale if the gain is to be set high.

SUMMARY OF THE INVENTION

The present invention has been made in view of the foregoing circumstances, and a general purpose thereof is to provide a photo detecting apparatus with a wider dynamic range.

One embodiment of the present invention relates to a photo detecting apparatus. This apparatus comprises: a plurality of pairs of data lines each pair thereof including a first data line and a second data line; a plurality of scanning lines; and pixel circuits arranged in intersections of the plurality of pairs of data line and the plurality of scanning lines, respectively. The pixel circuit includes: a photo detecting element one end of which is connected to a first fixed voltage line; a first detector which amplifies a voltage obtained by charging and discharging a capacitance of the photo detecting element with a photocurrent flowing through the photo detecting element and which outputs an amplified voltage to the first data line; and a second detector which outputs an electric charge stored in the capacitance of the photo detecting element by the photocurrent, to the second data line, wherein the pixel circuit operates in a first operation mode where the first detector is activated, a second operation mode where the second detector is activated and an initialization mode where the photo detecting element is initialized. The second detector includes a first transistor provided between the other end of the photo detecting element and the second data line; an electric charge stored in the capacitance is outputted to the second data line by turning on the first transistor in the second operation mode; and a reset voltage set in the second data line is applied to the other end of the photo detecting element to initialize the photo detecting element by turning on the first transistor in the initialization mode.

It is to be noted that any arbitrary combination of the above-described structural components and expressions converted among a method, an apparatus, a system and so forth are all effective as and encompassed by the present embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

The invention will now be described by reference to the preferred embodiments. This does not intend to limit the scope of the present invention, but to exemplify the invention.

A description of a typical embodiment will be given before describing a detailed description of the present invention.

One embodiment of the present invention relates to a photo detecting apparatus. This apparatus comprises: a plurality of pairs of data lines each pair thereof including a first data line and a second data line; a plurality of scanning lines; and pixel circuits arranged in intersections of the plurality of pairs of data line and the plurality of scanning lines, respectively. The pixel circuit includes: a photo detecting element one end of which is connected to a first fixed voltage line; a first detector which amplifies a voltage obtained by charging and discharging a capacitance of the photo detecting element with a photocurrent flowing through the photo detecting element and which outputs an amplified voltage to the first data line; and a second detector which outputs an electric charge stored in the capacitance of the photo detecting element by the photocurrent, to the second data line, wherein the pixel circuit operates in a first operation mode where the first detector is activated, a second operation mode where the second detector is activated and an initialization mode where the photo detecting element is initialized. The second detector includes a first transistor provided between the other end of the photo detecting element and the second data line; an electric charge stored in the capacitance is outputted to the second data line by turning on the first transistor in the second operation mode; and a reset voltage set in the second data line is applied to the other end of the photo detecting element to initialize the photo detecting element by turning on the first transistor in the initialization mode.

According to this embodiment, the pixel circuit is equipped with a first operation mode where a voltage obtained by charging and discharging the capacitance of the photo detecting element is amplified and outputted and a second operation mode where the electric charge stored up by charging and discharging the capacitance of the photo detecting element is read. Since in the first mode the voltage applied to the capacitance of the photo detecting element is amplified and read, a relatively low level of light can be detected in a highly sensitive manner. In the second operation mode, the electric charge stored up in the capacitance of the photo detecting element is read as it is, so that a strong light can be detected in a highly sensitive manner. Thus, if the operation modes of the pixel circuit are switched according to the light intensity, the dynamic range can be widened.

Also, in the initialization mode of the pixel circuit the first transistor plays a role of a reset transistor that applies the reset voltage outputted to the second data line to the other end of the photo detecting element, whereas in the second operation mode it plays a role of a switching transistor that the electric charge stored up in the capacitance of the photo detecting element is outputted to the second data line. Thus, there is no need to provide the switching transistor and the reset transistor separately, so that the size of the pixel circuit can be made smaller.

In this embodiment, the photo detecting apparatus may further comprise a mode control circuit, provided for each the plurality of pairs of data lines, which switches an operation mode of the pixel circuit between the first operation mode and the second operation mode, according to an amount of light received by the photo detecting element included in a pixel circuit connected thereto. Thereby, the mode can be switched, pixel by pixel, between the first mode and the second mode, according to the amount of light received by the photo detecting element. Hence, the dynamic range can be widened with ease.

The photo detecting apparatus may further comprise a constant-current source transistor, provided for each of the plurality of data lines, which functions as a constant-current source wherein a gate terminal thereof is connected to a third fixed voltage line, one end thereof is connected to a first data line in the pair of data lines and the other end thereof is connected to the first fixed voltage line, wherein the first detector may include a second transistor, where the other end of the photo detecting element is connected to a gate terminal thereof and one end thereof is connected to a second fixed voltage line and a first switching transistor provided between the other end of the second transistor and the first data line, and wherein in the first operation mode a source follower amplifier may be constituted by the second transistor and the constant-current transistor by turning on the first switching transistor, and then a voltage obtained by discharging the capacitance may be amplified and outputted to the first data line. Thereby, a constant-current transistor is provided for each pair of data lines. Hence the circuit area for the first detector can be made smaller as compared with a case where a constant-current transistor is provided for each pixel circuit.

Also, the photo detecting apparatus may further comprise an output amplifier provided for each of the plurality of data lines, and the output amplifier may include: an operational amplifier, having a first input terminal and a second input terminal, wherein a predetermined reference voltage is applied to the first and the second input terminal; a second switching transistor one end of which is connected to an output terminal of the operational amplifier and another end of which is connected to the second data line; an input capacitor and a third switching transistor which are provided in series between the first input terminal of the operational amplifier and the first data line; a fourth switching transistor which bypasses the input capacitor and the third switching transistor when the fourth switching transistor is on; a feedback capacitor provided between the output terminal of the operational amplifier and the first input terminal thereof; a fifth transistor provided on a feedback path in parallel with the feedback capacitor; and a sixth transistor one end of which is connected to the second data line and another end of which is connected to one end or another end of the fourth switching transistor, wherein in the first mode a voltage outputted from the pixel circuit may be amplified at a gain determined by a ratio of the input capacitor and the feedback capacitor, wherein in the second mode an electric charge outputted from the pixel circuit may be transferred to the feedback capacitor to be converted to a voltage, and wherein in the initialization mode the reset voltage may be generated by turning on the fifth switching transistor and outputting the predetermined voltage from the output voltage of the operational amplifier, and the reset voltage may be outputted to the second data line by turning on the second switching transistor.

Thereby, in the first mode the output amplifier can amplify the voltage by an operational amplifier comprised of an input capacitor and a feedback capacitor; in the second mode the output amplifier can convert the electric charge to a voltage; and in the initialization mode the output amplifier can generate the reset voltage.

A feedback loop of reset voltage may be formed between the pixel circuit and the output amplifier in such a manner that in the first mode the first detector circuit is set active and a reset voltage applied to the other end of the photo detecting element is amplified and outputted to the first data line, and then the fourth transistor is turned on and the amplified reset voltage outputted to the first data line is applied to the first input terminal of the operational amplifier. Thereby, even if the reset voltage applied to one end of the photo detecting element varies due to a variation in a threshold value of a transistor or thermal noise, the reset voltage can converge to a predetermined voltage by a feedback loop of reset voltage formed between the pixel circuit and the output amplifier.

Figure 2:
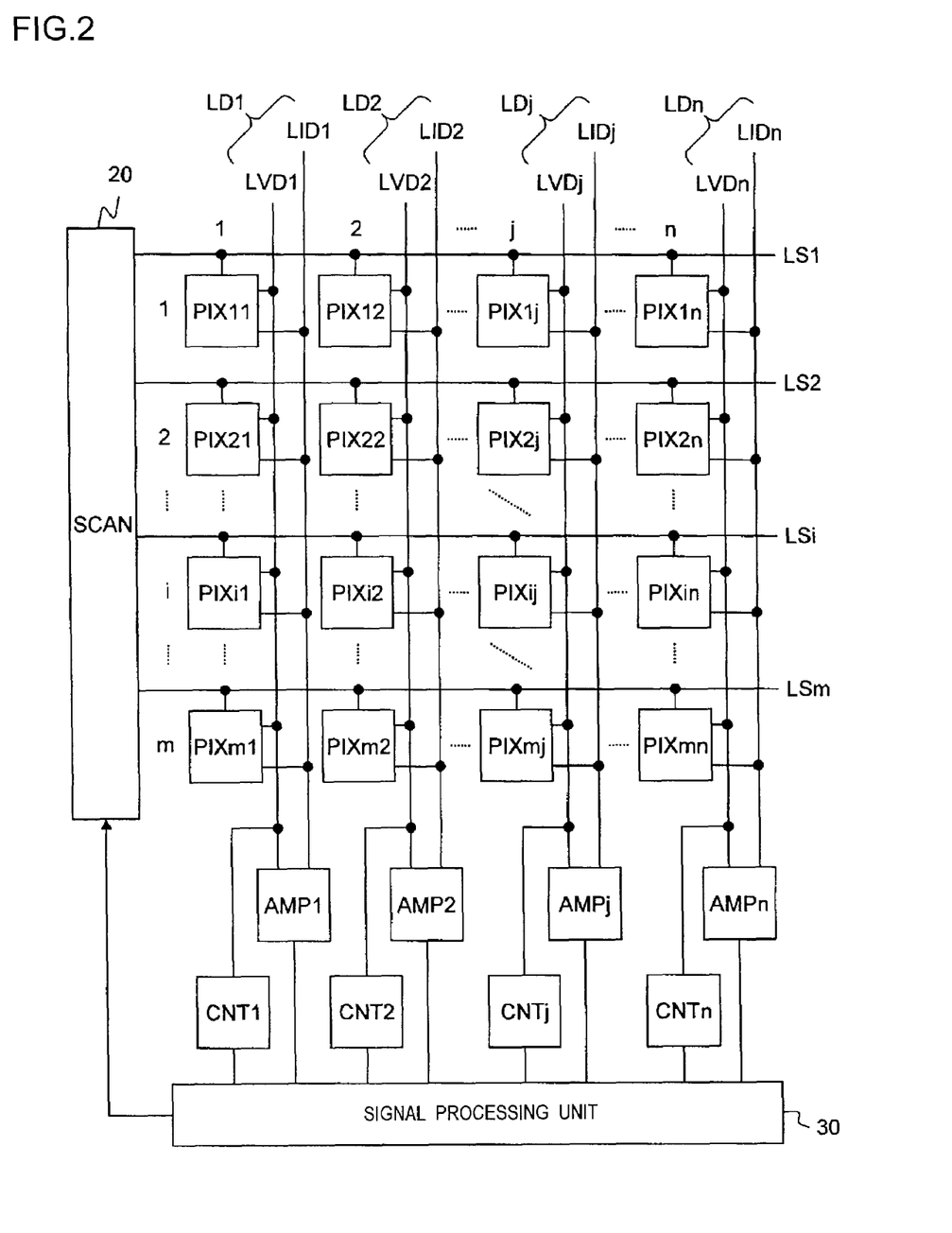
FIG. 2 is a circuit diagram showing a whole structure of a photo detecting apparatus according to an embodiment of the present invention.

A photo detecting apparatus according to an embodiment of the present invention is a CMOS image sensor, which is provided with a plurality of pixel circuits disposed in m rows and n columns. FIG. 2 is a circuit diagram showing a whole structure of a photo detecting apparatus according to the present embodiment.

A photo detecting apparatus 300 includes a plurality of pixel circuits (hereinafter referred to simply as pixels) PIX disposed two-dimensionally in m rows and n columns (m, n being an integer greater than or equal to 2), m scanning lines LS1 to LSm (collectively referred to as scanning lines LS) provided for each row of pixel circuits, n data line pairs LD1 to LDn (collectively referred to as data line pairs LD) provided for each column of pixel circuits, n output amplifiers AMP1 to AMPn (collectively referred to as output amplifiers AMP), n mode control circuits CNT1 to CNTn (collectively referred to as control circuits CNT), a scanning control unit 20, and a signal processing unit 30. A data line pair LD1 ($1 \leq i \leq n$) includes a first data line LVDi and a second data line LIDi.

The pixel circuits PIX are each disposed at each of the intersections of the plurality of first data lines LVD and the plurality of scanning lines LS. The pixel circuits PIX have each a photodiode, which is a photo detecting element. A pixel circuit PIX outputs the amount of light received by the photodiode as an electric signal to the first data line LVD or the second data line LID.

To distinguish the plurality of pixel circuits PIX, disposed in a matrix, from one another, the pixel at the intersection of the ith row and the jth column is denoted by PIXij in the following description. Each pixel circuit PIX, which has the same structure, is of an active pixel structure provided with an active element that amplifies a signal. Each pixel controls the voltage applied to the photodiode. Though the detail will be discussed later, a pixel circuit PIX is so configured that switching can be made between a first mode in which it operates as an active pixel sensor (APS) and a second mode in which it operates as a passive pixel sensor (PPS).

The n first data lines LVD1 to LVDn are provided for their respective columns, and pixels PIX1j to PIXmj of the jth column are connected to the first data line LVDj of the jth column. Also, similarly to the first data lines LVD, the n second data lines LID1 to LIDn are provided for their respective columns, and pixels PIX1j to PIXmj of the jth column are connected to the second data line LIDj of the jth column. When the pixel circuits PIX operate in the first mode, the amount of light detected by each pixel is outputted to the first data line LVD connected thereto. Also, when the pixel circuits PIX operate in the second mode, the amount of light detected by each pixel is outputted to the second data line LID connected thereto.

The m scanning lines LS1 to LSm are provided for their respective rows. The scanning control unit 20 controls the on and off of the active elements in the pixel circuits PIX via the scanning lines LS. The scanning control unit 20 selects the rows successively from the first to the mth row, turns the pixel circuits PIX in the selected row active, and reads out the amounts of light having entered the pixel circuits PIX on the selected row successively. Also, each pixel circuit PIX is supplied with a power supply voltage Vdd by a power supply line LVdd (not shown).

The output amplifiers AMP, which are provided for their respective first data lines LVD, amplify the signals outputted to the first data lines LVD from the pixel circuits PIX and output them to the signal processing unit 30. Also, the output amplifiers AMP, to which the second data lines LID are also connected, convert into voltages the signals outputted to the second data lines LID and output them to the signal processing unit 30. The operation mode of the output amplifiers AMP is switched in synchronization with the operation mode of the pixel circuits PIX.

The mode control circuits CNT, which are provided for their respective first data lines LVD, control the operation mode of the pixel circuits PIX connected thereto. The structure and operation of the output amplifiers AMP and the mode control circuits CNT are related to the structure and operation of the pixel circuits PIX. Therefore, a description will first be given of the structure of the pixel circuits PIX.

Figure 3:
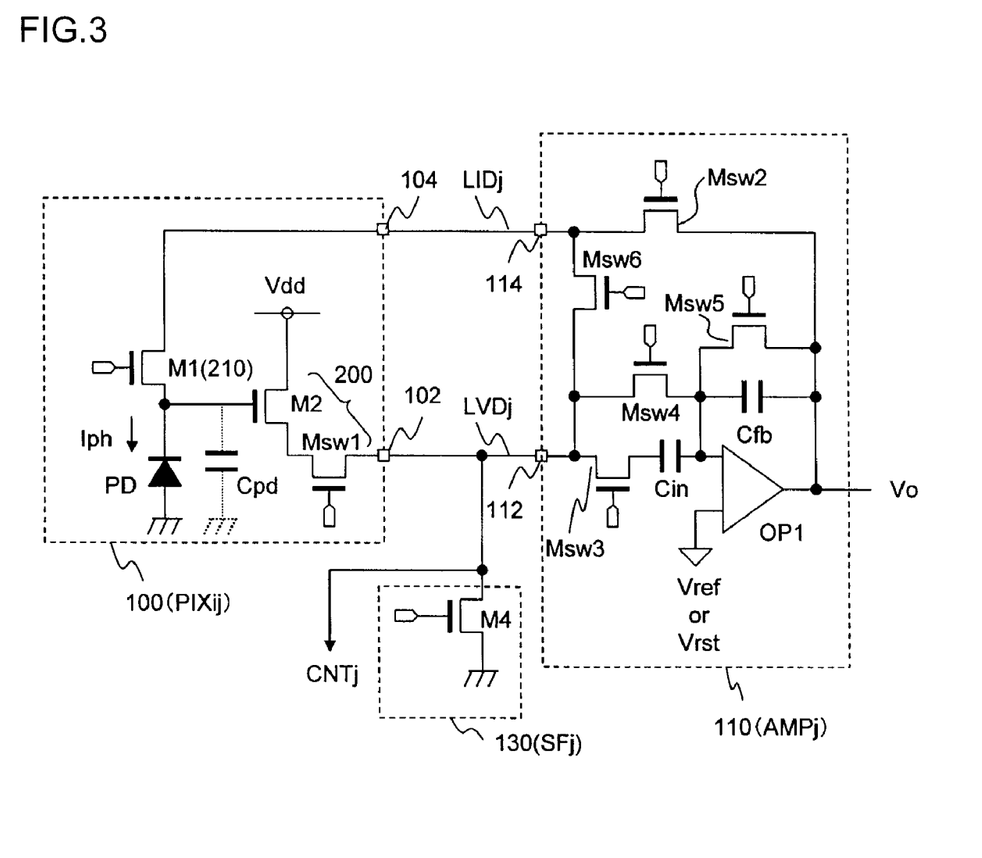
FIG. 3 is a circuit diagram showing a structure of a pixel circuit and an output amplifier according to an embodiment of the present invention.

FIG. 3 is a circuit diagram showing a structure of a pixel circuit 100 and an output amplifier 110 according to the present embodiment. The pixel circuit 100 includes a first detecting unit 200 and a second detecting unit 210 in addition to a photodiode PD, which is a photo detecting element. The first detecting unit 200 includes an amplifying transistor M2 and a first switch transistor Msw1. The second detecting unit 210 includes a reset transistor M1.

The reset transistor M1, the amplifying transistor M2, and the first switching transistor Msw1 are all n-channel MOS-FETs (Metal Oxide Semiconductor Field Effect Transistors). The pixel circuit 100 according to the present embodiment is so configured that switching can be made between a first mode in which it operates as an active pixel sensor (APS) interlocked with the output amplifier 110 and a second mode in which it operates as a passive pixel sensor (PPS) interlocked with the output amplifier 110.

The photodiode PD has its anode terminal grounded. At a cathode terminal of the photodiode PD there exist a photodiode PD's own parasitic capacitance, an inter-wiring capacitance (interconnection capacitance) and the like (hereinafter these capacitances will be referred to as cathode capacitance Cpd). The pixel circuit 100 outputs a signal corresponding to the intensity of light having entered the photodiode PD from an output terminal 102 when operating in the first mode, and outputs a signal corresponding to the intensity of light having entered the photodiode PD from an output terminal 104 when operating in the second mode.

The output terminal 102 is connected to a first data line LVDj of the column in which the pixel circuits 100 are provided, and the output terminal 104 is connected to a second data line LIDj of the column in which the pixel circuits 100 are provided.

The reset transistor M1, which is connected to the cathode terminal of the photodiode PD, initializes the cathode capacitance Cpd. The drain terminal of the reset transistor M1 is connected to the output terminal 104. At the time of initializing the cathode capacitance Cpd, the drain terminal of the reset transistor M1 is coupled to the output Vo of the output amplifier 110 via the second switching transistor Msw2, thereby forming a negative feedback loop between the pixel circuit 100 and the output amplifier 110.

The pixel circuit 100 discharges the electric charge stored in the cathode capacitance Cpd for a predetermined storage time by the photocurrent Iph flowing through the photodiode PD. When the pixel circuit 100 operates in the first mode, the amplifying transistor M2 and the first switching transistor Msw1 amplify the resulting voltage appearing at the cathode capacitance Cpd by a source follower amplifier and output it to the first data line LVD. The gate terminal of the amplifying transistor M2 is coupled to the cathode terminal of the photodiode PD, and the drain terminal thereof to the power supply line LVdd, so that a supply voltage Vdd is applied thereto.

The first switching transistor Msw1 is provided between the source terminal of the amplifying transistor M2 and the first data line LVDj to which the pixel circuit 100 is connected. That is, one end of the first switching transistor Msw1 is connected to the source terminal of the amplifying transistor M4, and the other end thereof to the output terminal 102.

On the other hand, when the pixel circuit 100 operates in the second mode, the reset transistor M1 functions as a switching transistor. That is, the reset transistor M1 discharges the cathode capacitance Cpd by the photocurrent Iph flowing through the photodiode PD and outputs the electric charge stored in the cathode capacitance Cpd via the second data line LIDj.

The pixel circuit 100 turns on and off the first switching transistor Msw1 and the reset transistor M1 to switch on an operation in the first mode or the second mode. Though the detail will be discussed later, the first switching transistor Msw1 turns on at least in the first mode, and the reset transistor M1 turns on at least in the second mode.

A load circuit 130 (SFj) connected to the source side of the amplifying transistor M2, which functions as a source follower amplifier, is provided outside the pixel circuit 100 for each first data line LVD and functions as part of the source follower amplifier. To be more specific, the load circuit 130 includes a constant-current transistor M4. The constant-current transistor M4, whose gate terminal is biased to a predetermined potential, operates as a constant-current source.

Also note that the gate terminal of each transistor of the pixel circuit 100 is connected to a scanning line (not shown), so that an on-off control can be performed independently.

Now, a description will be given of a structure of an output amplifier 110. The output amplifier 110 has its function switched in synchronization with the operation mode of the pixel circuit 100. In the first mode, the output amplifier 110 amplifies the voltage outputted from the pixel circuit 100 at a predetermined gain, and in the second mode, it converts the charge outputted from the pixel circuit 100 into a voltage.

An input terminal 112 of the output amplifier 110 is coupled to the output terminal 102 of the pixel circuit 100 via the first data line LVDj. Also, an input terminal 114 thereof is coupled to the output terminal 104 of the pixel circuit 100 via the second data line LIDj. The output amplifier 110 includes an operational amplifier OP1, a second switching transistor Msw2, a third switching transistor Msw3, a fourth switching transistor Msw4, a fifth switching transistor Msw5, a sixth switching transistor Msw6, an input capacitor Cin, and a feedback capacitor Cfb.

The operational amplifier OP1 is provided with a first input terminal and a second input terminal, which are an inverting input terminal and a noninverting input terminal, respectively. A predetermined reference voltage Vref is applied to the second input terminal. Also, when the cathode capacitance Cpd of the pixel circuit 100 is to be reset, a reset voltage Vrst, instead of the reference voltage Vref, is applied to the second input terminal.

The input capacitor Cin and the third switching transistor Msw3 are connected in series between the first input terminal of the operational amplifier OP1 and the input terminal 112 to which the first data line LVDj is connected. The fourth switching transistor Msw4 is provided between the first input terminal 112 and the first input terminal of the operational amplifier OP1. When it is on, the fourth switching transistor Msw4 bypasses the input capacitor Cin and the third switching transistor Msw3.

The feedback capacitor Cfb is provided between the output terminal of the operational amplifier OP1 and the first input terminal. This feedback capacitor Cfb may be constituted as a variable-capacitance capacitor. The fifth switching transistor Msw5 is provided on a feedback path in parallel with the feedback capacitor Cfb and, when it is on, bypasses the feedback capacitor Cfb or initializes the charge stored.

The second switching transistor Msw2 is provided between the output terminal of the operational amplifier OP1 and the input terminal 114 and, when it is on, couples the drain terminal of the reset transistor M1 to the output terminal of the operational amplifier OP1, thereby forming a negative feedback loop between the pixel circuit 100 and the output amplifier 110 and initializing the cathode capacitance Cpd of the pixel circuit 100. The sixth switching transistor Msw6, of which one end is connected to the input terminal 114 and the other end is connected to one end or the other of the fourth switching transistor, transfers the charge outputted from the output terminal 104 of the pixel circuit 100 to the feedback capacitor Cfb.

In the first mode, the output amplifier 110 amplifies the voltage outputted from the output terminal 102 of the pixel circuit 100 at a gain g(=Cin/Cfb) which is determined by the capacitance ratio between the input capacitor Cin and the feedback capacitor Cfb. Also, in the second mode, the output amplifier 110 converts the electric charge outputted from the output terminal 102 into a voltage by transferring it to the feedback capacitor Cfb.

To widen the dynamic range, a photo detecting apparatus 300 according to the present invention switches between a first mode and a second mode according to the illuminance, or the amount of light received by the photodiode PD in each pixel circuit. The photo detecting apparatus 300 tentatively reads the amount of light received by the photodiode first and then operates in the first mode if the value read is lower than a predetermined threshold value or in the second mode if it is higher than that.

A mode control circuit CNT is provided to effect an appropriate switching between the first mode and the second mode. The mode control circuit CNT, which is provided for each first data line LVD, switches the operation mode of the pixel circuit PIX and the output amplifier AMP according to the amount of light received by the photodiode in the pixel circuit PIX connected thereto.

The mode control circuit CNT monitors the potential on the first data line LVD connected thereto in correspondence to the amount of light received by the photodiode and switches between the first mode and the second mode according to the potential on the data line.

Figure 4:
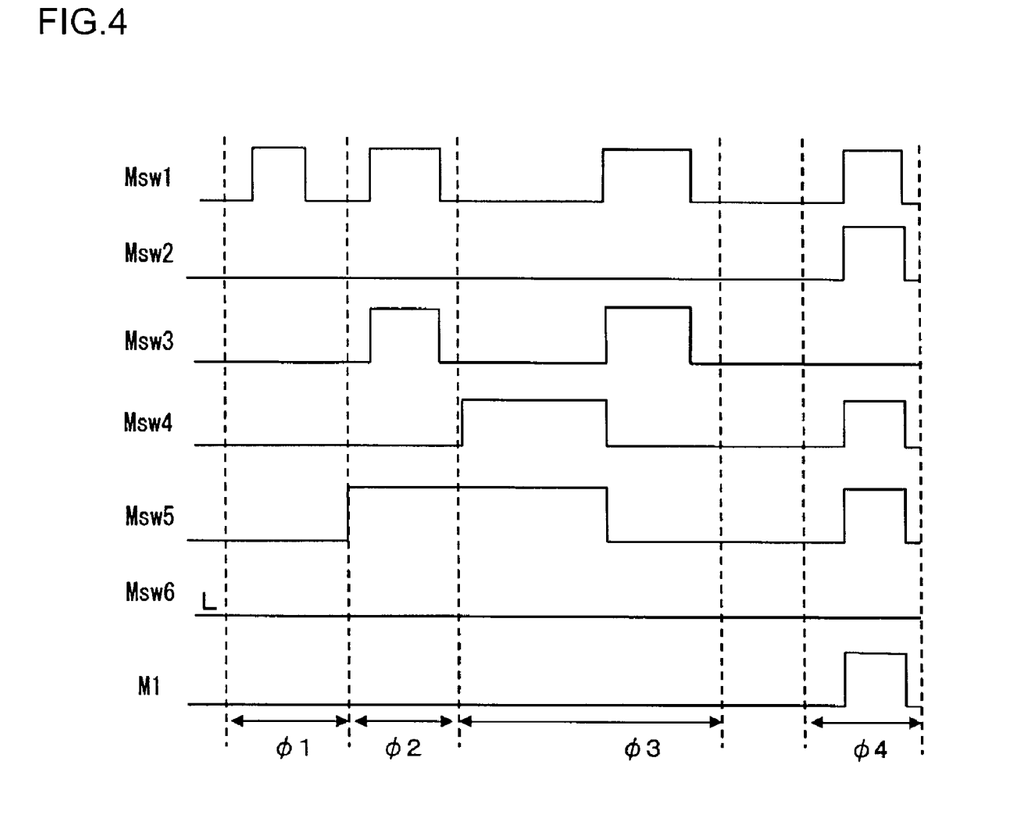
FIG. 4 is an operation sequence diagram for each pixel in a first mode.
Figure 5:
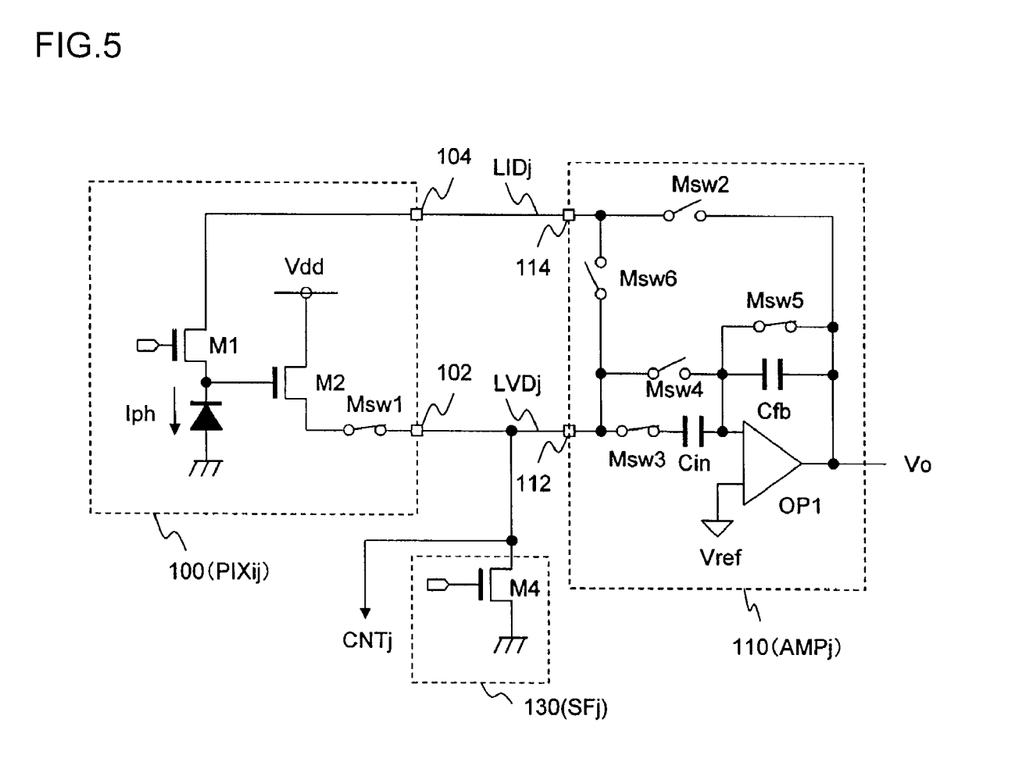
FIG. 5 is a circuit diagram showing an on-off state of each transistor in a potential detecting period in a first mode.
Figure 6:
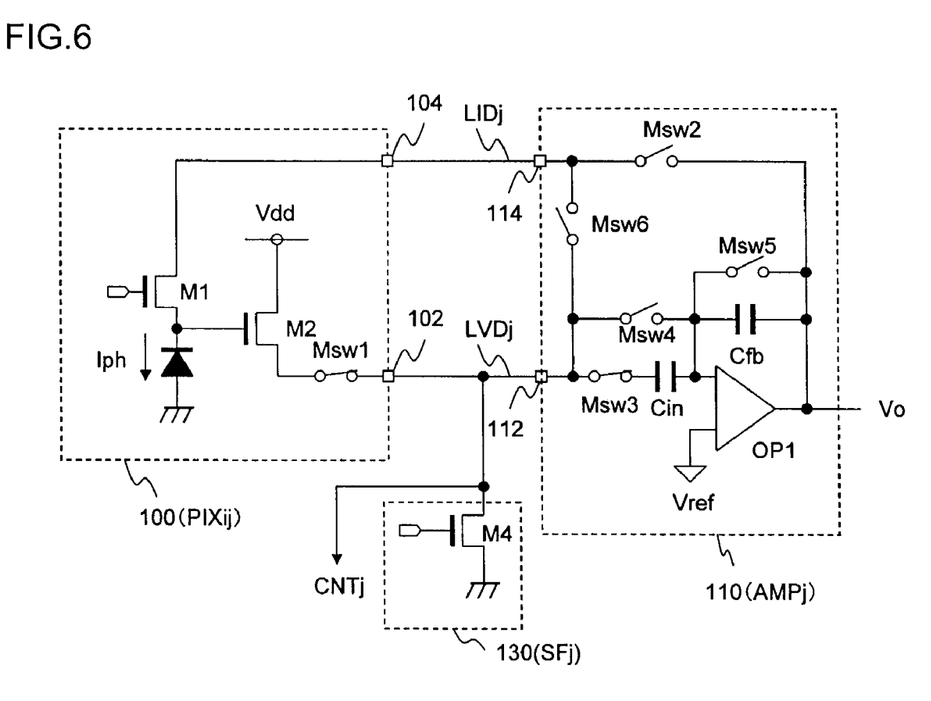
FIG. 6 is a circuit diagram showing an on-off state of each transistor in a read period in a first mode.
Figure 7:
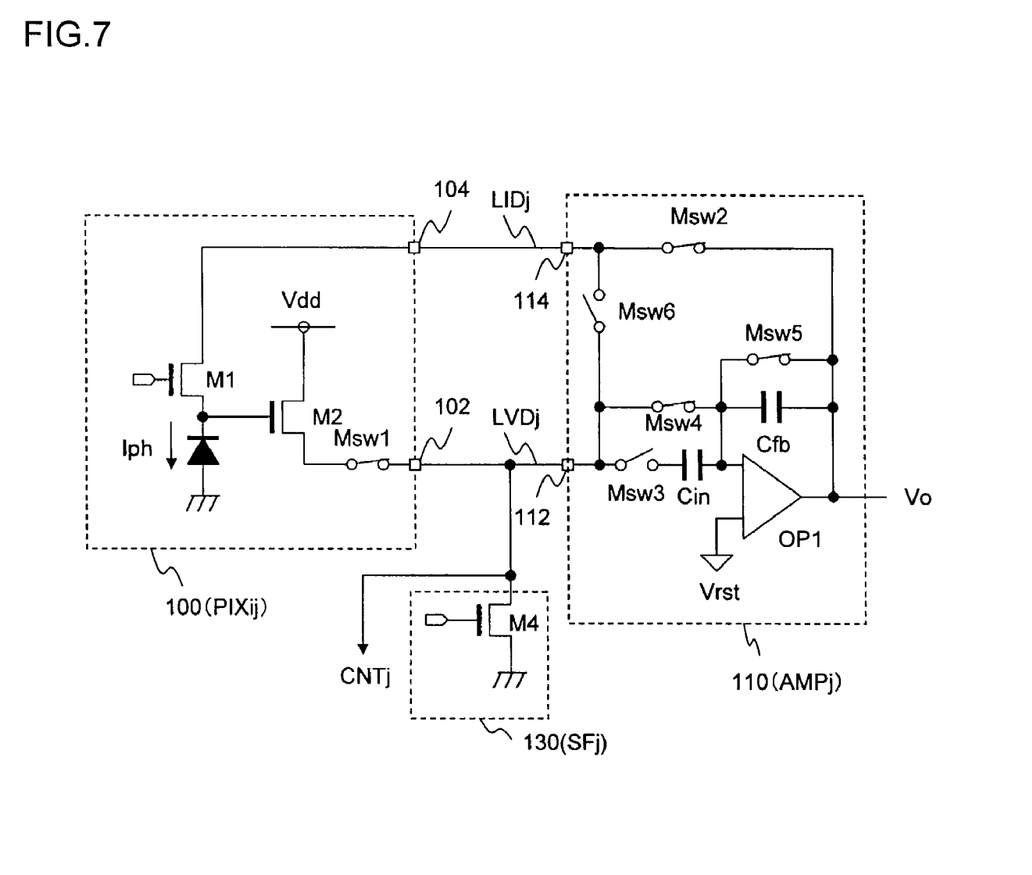
FIG. 7 is a circuit diagram showing an on-off state of each transistor in a reset period.

A description will be given of an operation of a photo detecting apparatus 300 according to the present embodiment as described above. Firstly, the operation in the first mode will be explained. FIG. 4 is an operation sequence diagram for each pixel in the first mode. In FIG. 4, the high level of each signal corresponds to the ON state of each transistor, and the low level of each signal corresponds to the OFF state thereof. FIG. 5 to FIG. 7 are circuit diagrams showing the ON and OFF states of the respective transistors in the first mode.

As shown in FIG. 4, there is a level deciding period $\phi 1$ provided before the detection of the amount of light received by each pixel circuit. During this level deciding period $\phi 1$, the first switch transistor Msw1 is at least on, and the potential on the first data line LVD is set by the source follower amplifier. The mode control circuit CNT sets the first mode or the second mode according to the potential on the first data line LVD at this time.

When the first mode is set during the level deciding period $\phi 1$, the sixth switching transistor Msw6 is turned off. In the first mode, the level deciding period $\phi 1$ is followed by a potential detecting period $\phi 2$. During the potential detecting period $\phi 2$, at least the first switching transistor Msw1, the third switching transistor Msw3, and the fifth switching transistor Msw5 turn on first. FIG. 5 shows the state at this point. With the fifth switching transistor Msw5 turning on, the operational amplifier OP1 functions as a voltage follower. At this time, the potential at the first input terminal of the operational amplifier OP1 is the reference voltage Vref applied to the second input terminal, which is applied to the right-hand electrode of the input capacitor Cin.

Also, with the first switching transistor Msw1 and the third switching transistor Msw3 turning on, the potential at the cathode terminal of the photodiode PD at this time is read out through the source follower amplifier. The potential at the cathode terminal of the photodiode PD is stored in the left-hand electrode of the input capacitor Cin.

In the following read period $\phi 3$, the first switching transistor Msw1 and the third switching transistor Msw3 are once turned off, and the fourth switching transistor Msw4 is turned on. Then the fourth switching transistor Msw4 and the fifth switching transistor Msw5 are turned off, and again the first switching transistor Msw1 and the third switching transistor Msw3 are turned on, so that the charge stored in the input capacitor Cin is transferred to the feedback capacitor Cfb. Thereupon, the output amplifier 110 amplifies the voltage outputted from the pixel circuit 100 at a gain g(=Cin/Cfb) which is determined by the capacitance ratio between the input capacitor Cin and the feedback capacitor Cfb and outputs the output voltage Vo. FIG. 6 shows the state at this point.

In the following reset period $\phi 4$, at least the first switching transistor Msw1, the second switching transistor Msw2, the fourth switching transistor Msw4, the fifth switching transistor Msw5, and the reset transistor M1 are first turned on, so that a feedback loop is formed between the pixel circuit 100 and the output amplifier 110. FIG. 7 shows the state at this point. As a result, the cathode capacitance Cpd of the pixel circuit 100 is initialized by the voltage Vref applied to the second input terminal of the operational amplifier OP1 without being subject to the variation among the transistors. Moreover, by controlling the reset transistor M1 to turn off gradually, it is possible to suppress the noise that would otherwise occur at the turning-off of the reset transistor M1.

In the first mode, each pixel circuit outputs a voltage according to the amount of light received through a sequence of operation as described above.

Figure 8:
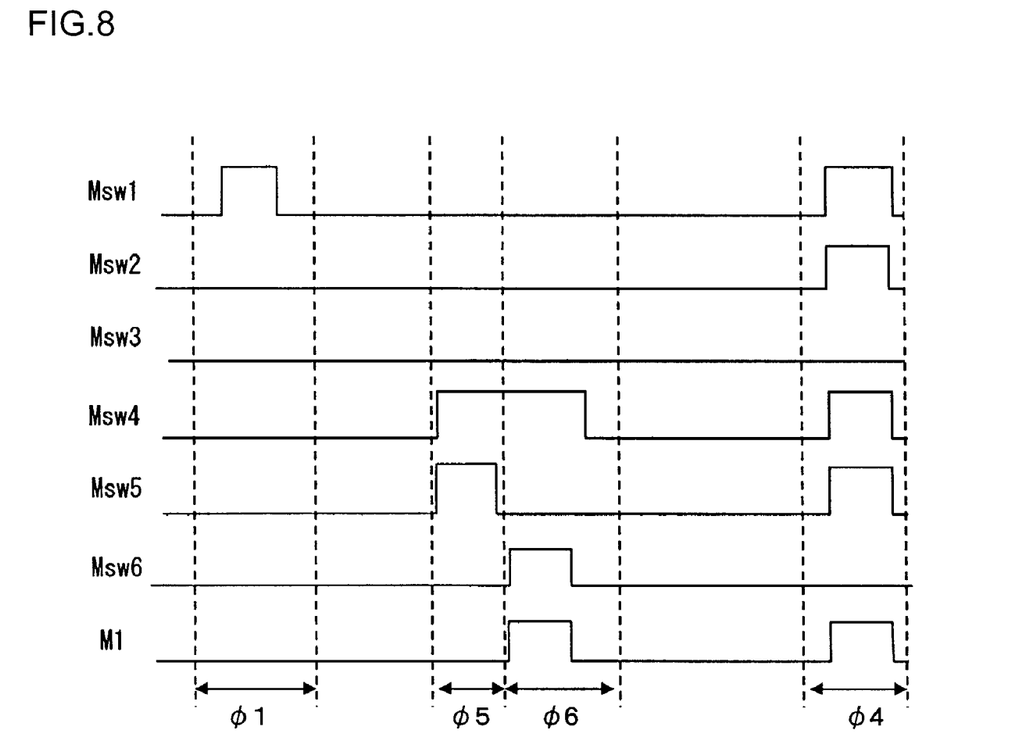
FIG. 8 is an operation sequence diagram for each pixel in a second mode.
Figure 9:
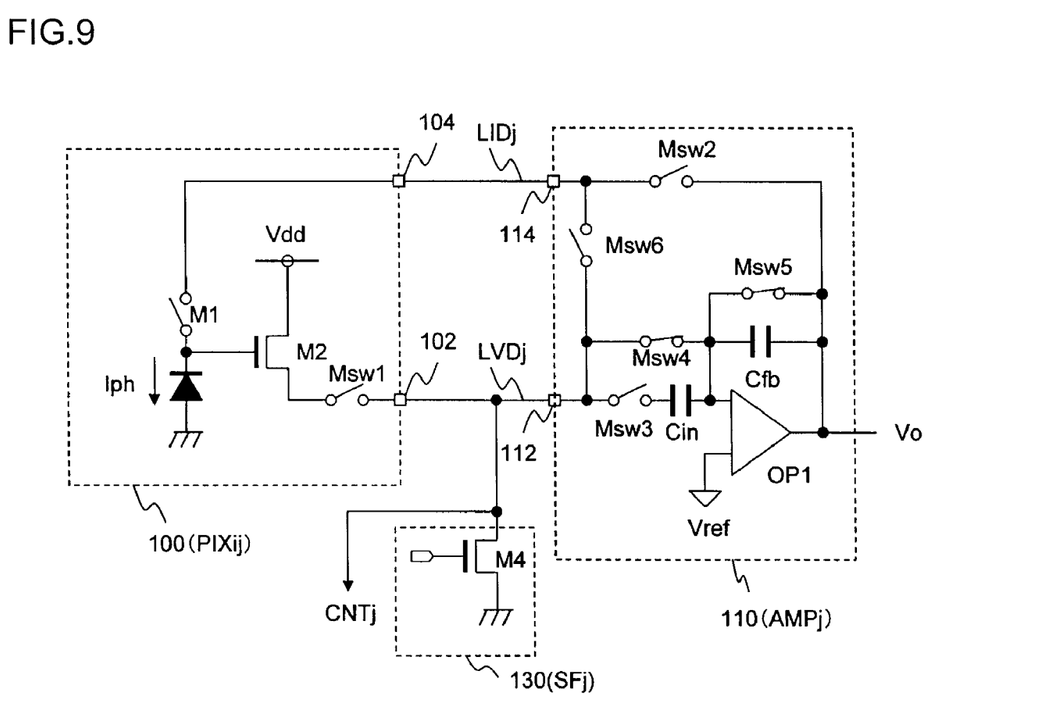
FIG. 9 is a circuit diagram showing an on-off state of each transistor in a virtual grounding period in a second mode.
Figure 10:
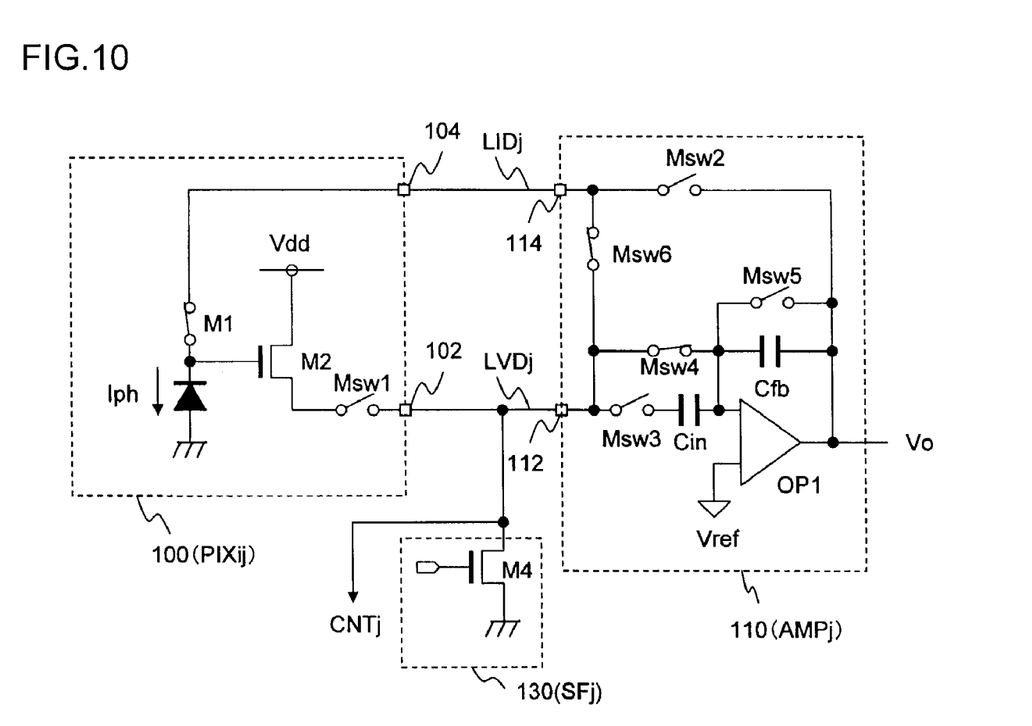
FIG. 10 is a circuit diagram showing an on-off state of each transistor in a read period in a second mode.

Next, an operation in the second mode will be explained. FIG. 8 is an operation sequence diagram for each pixel in the second mode. FIG. 9 and FIG. 10 are circuit diagrams showing ON and OFF states of the respective transistors in the second mode.

There is a level deciding period $\phi 1$ provided before the detection of the amount of light received by each pixel circuit. During this period, the first mode or the second mode is set, and further the gain is set. If the second mode is set during this level deciding period $\phi 1$, the first switching transistor Msw1 and the third switching transistor Msw3 are turned off because the source follower amplifier does not operate in the second mode.

In the second mode, the level deciding period $\phi 1$ is followed by a virtual grounding period $\phi 5$. During the virtual grounding period $\phi 5$, the fourth switching transistor Msw4 and the fifth switching transistor Msw5 turn on, and the output amplifier 110 is set to the voltage follower. As a result, the first and second input terminals of the operational amplifier OP1 are virtually grounded, and the electric charge stored in the feedback capacitor Cfb is reset. FIG. 9 shows the state at this point.

Next, in the read period $\phi 6$, the fifth switching transistor Msw5 is turned off, while the fourth switching transistor Msw4 are kept on, and further the reset transistor M1 and the sixth switching transistor Msw6 are turned on, so that the charge stored in the cathode capacitance Cpd is transferred to the feedback capacitor Cfb through the second data line LID. As a result, the output amplifier 110 converts the charge into a voltage and outputs the output voltage Vo according to the amount of light received. FIG. 10 shows the state at this point.

In the following reset period $\phi 4$, as in the first mode, the cathode capacitance Cpd is initialized. In the second mode, each pixel circuit outputs voltages according to the amounts of light received through a sequence of operations as described above.

The structure and operation of a photo detecting apparatus 300 according to the present embodiment are as described hereinabove. Thus the pixel circuit 100 of the photo detecting apparatus 300 according to the present embodiment can provide a wider dynamic range because it allows switching between a first mode where it operates as an active pixel sensor for each pixel according to the amount of light received and a second mode where it operates as a passive pixel sensor.

When it is attempted to widen the dynamic range by changing the gain and storage time with an active pixel sensor of conventional technology, it is necessary to make the storage time extremely short when the amount of light received is large. This results in the problem of larger scale of circuit and more power consumption. For the photo detecting apparatus 300 according to the present embodiments, on the other hand, it is not necessary to make the storage time short because it functions also as a passive pixel sensor in response to high illuminance. Hence, this can prevent the circuit from getting more complex, larger in scale and more power-consuming.

Also, the photo detecting apparatus 300 according to the present embodiment can initialize the cathode capacitance Cpd without being subject to variation among the transistors, because it forms a negative feedback loop between the pixel circuit 100 and the output amplifier 110 when initializing the cathode capacitance Cpd.

Moreover, the photo detecting apparatus 300 according to the present embodiments uses the reset transistor M1 as a switching transistor for pixel selection when it operates in the second mode where it functions as a passive pixel sensor. Accordingly, it is not necessary to provide a separate pixel selection switch for the passive pixel sensor, and thus the pixel circuit may be made smaller.

The present invention has been described based on the embodiments. These embodiments are merely exemplary, and it is understood by those skilled in the art that various modifications to the combination of each component and each process thereof are possible and that such modifications are also within the scope of the present invention.

In a modification, the reference voltage Vref may be set to different values between the first mode and the second mode. In such a modification, the reference voltage in the second mode (hereinafter referred to as second reference voltage Vref2) is set lower than the reference voltage in the first mode (hereinafter referred to as first reference voltage Vref1).

Figure 11:
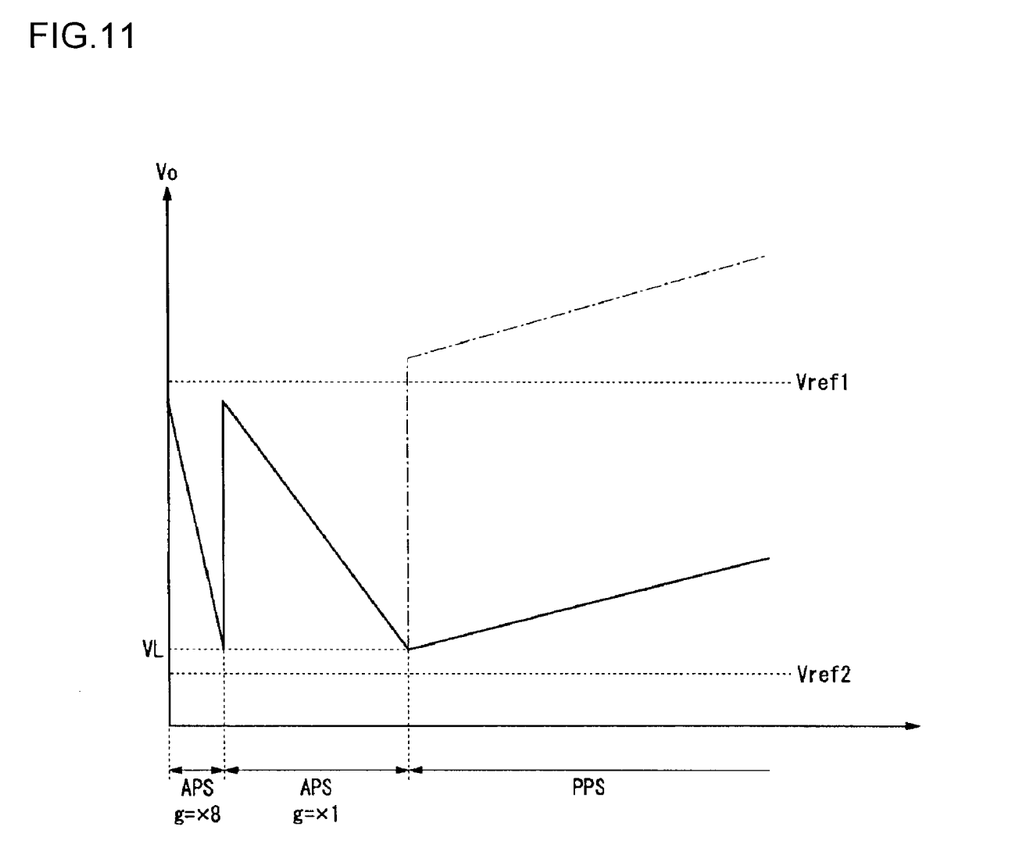
FIG. 11 illustrates an operating state of a pixel circuit according to a modification.

Thus, according to this modification, not only the output amplifier 110 but also the cathode capacitance Cpd of the photodiode PD is initialized by the reference voltage Vref. FIG. 11 shows how a pixel circuit 100 according to this modification operates.

In FIG. 11, the horizontal axis represents the amount of light received, and vertical axis the output voltage Vo. When the gain in the first mode is 8×, the cathode capacitance Cpd of the photodiode PD is initialized by the first reference voltage Vref1 after the above-described process. At this time, the output voltage Vo takes a value near the first reference voltage Vref1. As the amount of light received increases, the output voltage Vo drops gradually from the neighborhood of the first reference voltage Vref1.

When the gain in the first mode is 1×, the cathode capacitance Cpd of the photodiode PD is initialized by the first reference voltage Vref1 in the same manner as when the gain is 8×. As the amount of light received increases, the output voltage Vo drops. The slope of the dropping is dependent on the gain of the output amplifier AMP.

In the second mode, the cathode capacitance Cpd of the photodiode PD is initialized by the second reference voltage Vref2. The output voltage Vo take the voltage near the second reference voltage Vref2 as the initial value and increases in proportion to the amount of light received. In this manner, the direction of increase and decrease of the output voltage Vo relative to the amount of light received is opposite between the first mode and the second mode, and the dependence of the output voltage Vo of the output amplifier AMP on the amount of light received is opposite between them.

In FIG. 11, the operation when the same value (=Vref1) is set for the reference voltage Vref for both the first mode and the second mode is shown by a dashed-dotted line. In this case, in the second mode, the output voltage Vo is initialized by the reference voltage Vref1 and increases in proportion to the amount of light received. As a result, the voltage range of the output voltage Vo will be very wide if both the first mode and the second mode are taken into consideration. This means a narrowed dynamic range of the amount of light received in a circuit that limits the supply voltage Vdd.

In contrast to this, according to the present modification, switching of the reference voltage Vref to be applied to the output amplifier AMP between the first mode and the second mode can set the voltage range of the output voltage Vo narrower, so that the dynamic range of the amount of light received can be widened.

Also, as another modification, the reference voltage is set to a fixed value, and one input terminal of the operating amplifier and the other input terminal thereof are used as the reference voltage and the input voltage, respectively. In the first mode and the second mode, the two input terminals may be inverted by a switch provided within the circuit. As a result, the operating amplifier can switch the inverting amplification and the nonineverting amplification. In this case, the direction of change in the output voltage Vo relative to the amount of light received is the same between the first mode and the second mode, so that the voltage range can be made narrower.

In the present embodiments, the load circuit 130 may be so configured that it is provided between a first data line LVD and a grounding terminal with fixed potential and it includes a transistor which turns on in the first mode and turns off in the second mode.

According to the present embodiments as described above, the transistors used in the pixel circuit have all been n-channel MOSFETs. However, it is possible to use p-channel MOSFETs for some of the transistors. In such a case, the high level and the low level of the signals to be applied to the gates may be inverted as appropriate.

According to the present embodiments as described above, each pixel is provided with a photodiode PD. However, a phototransistor or the like may be used instead. In such a case, any photo detecting element in which the flow of photocurrent changes according to the intensity of incident light may be acceptable.

While the preferred embodiments of the present invention have been described using specific terms, such description is for illustrative purposes only, and it is to be understood that changes and variations may be made without departing from the spirit or scope of the appended claims.

What is claimed is:

1. A photo detecting apparatus, comprising:
a plurality of pairs of data lines each pair thereof including a first data line and a second data line;
a plurality of scanning lines; and
pixel circuits, arranged respectively in intersections of said plurality of pairs of data lines and said plurality of scanning lines, the pixel circuit including:
a photo detecting element one end of which is connected to a first fixed voltage line;
a first detector which amplifies a voltage obtained by charging and discharging a capacitance of the photo detecting element with a photocurrent flowing through the photo detecting element and which outputs an amplified voltage to the first data line; and
a second detector which outputs an electric charge stored in the capacitance of the photo detecting element by the photocurrent, to the second data line,
wherein the pixel circuit operates in a first operation mode where the first detector is activated, a second operation mode where the second detector is activated and an initialization mode where the photo detecting element is initialized, wherein the second detector includes a first transistor provided between the other end of the photo detecting element and the second data line; an electric charge stored in the capacitance is outputted to the second data line by turning on the first transistor in the second operation mode; and a reset voltage set in the second data line is applied to the other end of the photo detecting element to initialize the photo detecting element by turning on the first transistor in the initialization mode.

2. A photo detecting apparatus according to claim 1, further comprising a mode control circuit, provided for each the plurality of pairs of data lines, which switches an operation mode of the pixel circuit between the first operation mode and the second operation mode, according to an amount of light received by the photo detecting element included in a pixel circuit connected thereto.

3. A photo detecting apparatus according to claim 1, further comprising a constant-current source transistor, provided for each of the plurality of data lines, which functions as a constant-current source wherein a gate terminal thereof is connected to a third fixed voltage line, one end thereof is connected to a first data line in the pair of data lines and the other end thereof is connected to the first fixed voltage line, wherein the first detector includes a second transistor, where the other end of the photo detecting element is connected to a gate terminal thereof and one end thereof is connected to a second fixed voltage line and a first switching transistor provided between the other end of the second transistor and the first data line, and wherein in the first operation mode a source follower amplifier is constituted by the second transistor and the constant-current transistor by turning on the first switching transistor, and then a voltage obtained by discharging the capacitance is amplified and outputted to the first data line.

4. A photo detecting apparatus according to claim 2, further comprising a constant-current source transistor, provided for each of the plurality of data lines, which functions as a constant-current source wherein a gate terminal thereof is connected to a third fixed voltage line, one end thereof is connected to a first data line in the pair of data lines and the other end thereof is connected to the first fixed voltage line, wherein the first detector includes a second transistor, where the other end of the photo detecting element is connected to a gate terminal thereof and one end thereof is connected to a second fixed voltage line and a first switching transistor provided between the other end of the second transistor and the first data line, and wherein in the first operation mode a source follower amplifier is constituted by the second transistor and the constant-current transistor by turning on the first switching transistor, and then a voltage obtained by discharging the capacitance is amplified and outputted to the first data line.

5. A photo detecting apparatus according to claim 1, further comprising an output amplifier provided for each of the plurality of data lines, said output amplifier including:

an operational amplifier, having a first input terminal and a second input terminal, wherein a predetermined reference voltage is applied to the first and the second input terminal;

a second switching transistor one end of which is connected to an output terminal of the operational amplifier and another end of which is connected to the second data line;

an input capacitor and a third switching transistor which are provided in series between the first input terminal of the operational amplifier and the first data line;

a fourth switching transistor which bypasses the input capacitor and the third switching transistor when the fourth switching transistor is on;

a feedback capacitor provided between the output terminal of the operational amplifier and the first input terminal thereof;

a fifth transistor provided on a feedback path in parallel with the feedback capacitor; and a sixth transistor one end of which is connected to the second data line and another end of which is connected to one end or another end of the fourth switching transistor, wherein in the first mode a voltage outputted from the pixel circuit is amplified at a gain determined by a ratio of the input capacitor and the feedback capacitor, wherein in the second mode an electric charge outputted from the pixel circuit is transferred to the feedback capacitor to be converted to a voltage, and wherein in the initialization mode the reset voltage is generated by turning on the fifth switching transistor and outputting the predetermined voltage from the output voltage of the operational amplifier, and the reset voltage is outputted to the second data line by turning on the second switching transistor.

6. A photo detecting apparatus according to claim 2, further comprising an output amplifier provided for each of the plurality of data lines, said output amplifier including:

an operational amplifier, having a first input terminal and a second input terminal, wherein a predetermined reference voltage is applied to the first and the second input terminal;

a second switching transistor one end of which is connected to an output terminal of the operational amplifier and another end of which is connected to the second data line;

an input capacitor and a third switching transistor which are provided in series between the first input terminal of the operational amplifier and the first data line;

a fourth switching transistor which bypasses the input capacitor and the third switching transistor when the fourth switching transistor is on;

a feedback capacitor provided between the output terminal of the operational amplifier and the first input terminal thereof;

a fifth transistor provided on a feedback path in parallel with the feedback capacitor; and a sixth transistor one end of which is connected to the second data line and another end of which is connected to one end or another end of the fourth switching transistor, wherein in the first mode a voltage outputted from the pixel circuit is amplified at a gain determined by a ratio of the input capacitor and the feedback capacitor, wherein in the second mode an electric charge outputted from the pixel circuit is transferred to the feedback capacitor to be converted to a voltage, and wherein in the initialization mode the reset voltage is generated by turning on the fifth switching transistor and outputting the predetermined voltage from the output voltage of the operational amplifier, and the reset voltage is outputted to the second data line by turning on the second switching transistor.

7. A photo detecting apparatus according to claim 3, further comprising an output amplifier provided for each of the plurality of data lines, said output amplifier including:

an operational amplifier, having a first input terminal and a second input terminal, wherein a predetermined reference voltage is applied to the first and the second input terminal;

a second switching transistor one end of which is connected to an output terminal of the operational amplifier and another end of which is connected to the second data line;

an input capacitor and a third switching transistor which are provided in series between the first input terminal of the operational amplifier and the first data line;

a fourth switching transistor which bypasses the input capacitor and the third switching transistor when the fourth switching transistor is on;

a feedback capacitor provided between the output terminal of the operational amplifier and the first input terminal thereof;

a fifth transistor provided on a feedback path in parallel with the feedback capacitor; and a sixth transistor one end of which is connected to the second data line and another end of which is connected to one end or another end of the fourth switching transistor, wherein in the first mode a voltage outputted from the pixel circuit is amplified at a gain determined by a ratio of the input capacitor and the feedback capacitor, wherein in the second mode an electric charge outputted from the pixel circuit is transferred to the feedback capacitor to be converted to a voltage, and wherein in the initialization mode the reset voltage is generated by turning on the fifth switching transistor and outputting the predetermined voltage from the output voltage of the operational amplifier, and the reset voltage is outputted to the second data line by turning on the second switching transistor.

8. A photo detecting apparatus according to claim 4, further comprising an output amplifier provided for each of the plurality of data lines, said output amplifier including:

an operational amplifier, having a first input terminal and a second input terminal, wherein a predetermined reference voltage is applied to the first and the second input terminal;

a second switching transistor one end of which is connected to an output terminal of the operational amplifier and another end of which is connected to the second data line;

an input capacitor and a third switching transistor which are provided in series between the first input terminal of the operational amplifier and the first data line;

a fourth switching transistor which bypasses the input capacitor and the third switching transistor when the fourth switching transistor is on;

a feedback capacitor provided between the output terminal of the operational amplifier and the first input terminal thereof;

a fifth transistor provided on a feedback path in parallel with the feedback capacitor; and a sixth transistor one end of which is connected to the second data line and another end of which is connected to one end or another end of the fourth switching transistor, wherein in the first mode a voltage outputted from the pixel circuit is amplified at a gain determined by a ratio of the input capacitor and the feedback capacitor, wherein in the second mode an electric charge outputted from the pixel circuit is transferred to the feedback capacitor to be converted to a voltage, and wherein in the initialization mode the reset voltage is generated by turning on the fifth switching transistor and outputting the predetermined voltage from the output voltage of the operational amplifier, and the reset voltage is outputted to the second data line by turning on the second switching transistor.

9. A photo detecting apparatus according to claim 5, wherein a feedback loop of reset voltage is formed between the pixel circuit and the output amplifier in such a manner that in the first mode the first detector circuit is set active and a reset voltage applied to the other end of the photo detecting element is amplified and outputted to the first data line, and then the fourth transistor is turned on and the amplified reset voltage outputted to the first data line is applied to the first input terminal of the operational amplifier.

10. A photo detecting apparatus according to claim 6, wherein a feedback loop of reset voltage is formed between the pixel circuit and the output amplifier in such a manner that in the first mode the first detector circuit is set active and a reset voltage applied to the other end of the photo detecting element is amplified and outputted to the first data line, and then the fourth transistor is turned on and the amplified reset voltage outputted to the first data line is applied to the first input terminal of the operational amplifier.

11. A photo detecting apparatus according to claim 7, wherein a feedback loop of reset voltage is formed between the pixel circuit and the output amplifier in such a manner that in the first mode the first detector circuit is set active and a reset voltage applied to the other end of the photo detecting element is amplified and outputted to the first data line, and then the fourth transistor is turned on and the amplified reset voltage outputted to the first data line is applied to the first input terminal of the operational amplifier.

12. A photo detecting apparatus according to claim 8, wherein a feedback loop of reset voltage is formed between the pixel circuit and the output amplifier in such a manner that in the first mode the first detector circuit is set active and a reset voltage applied to the other end of the photo detecting element is amplified and outputted to the first data line, and then the fourth transistor is turned on and the amplified reset voltage outputted to the first data line is applied to the first input terminal of the operational amplifier.

13. A photo detecting apparatus according to claim 5, wherein the reference voltage in the second mode is set lower than that in the first operation mode.

14. A photo detecting apparatus according to claim 6, wherein the reference voltage in the second mode is set lower than that in the first operation mode.

15. A photo detecting apparatus according to claim 7, wherein the reference voltage in the second mode is set lower than that in the first operation mode.

16. A photo detecting apparatus according to claim 8, wherein the reference voltage in the second mode is set lower than that in the first operation mode.

* * * * *